F. W. HULSE.
COTTON PICKER.
APPLICATION FILED APR. 21, 1919.
1,324,549.
Patented Dec. 9, 1919.
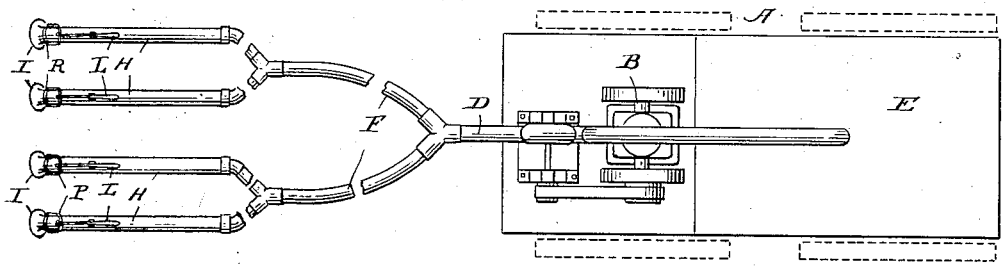
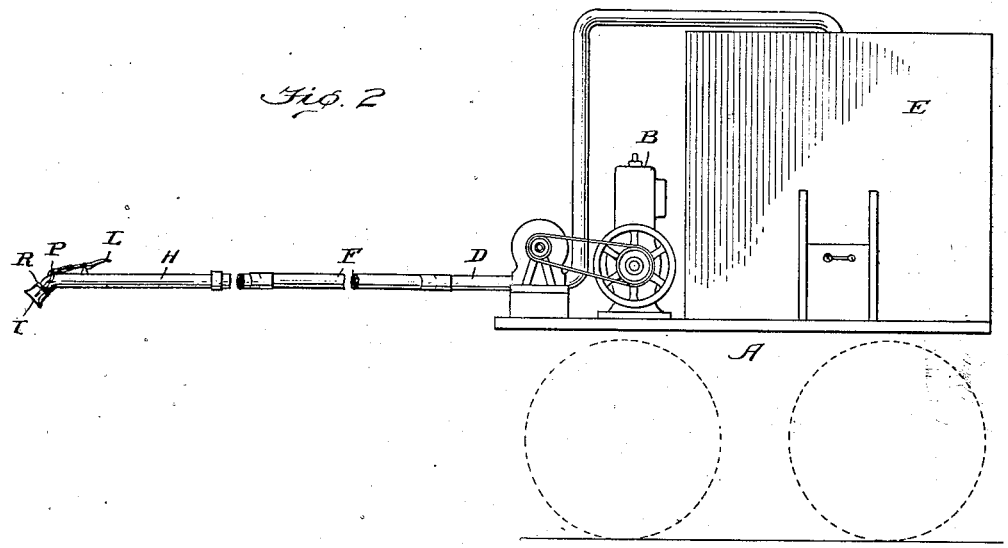
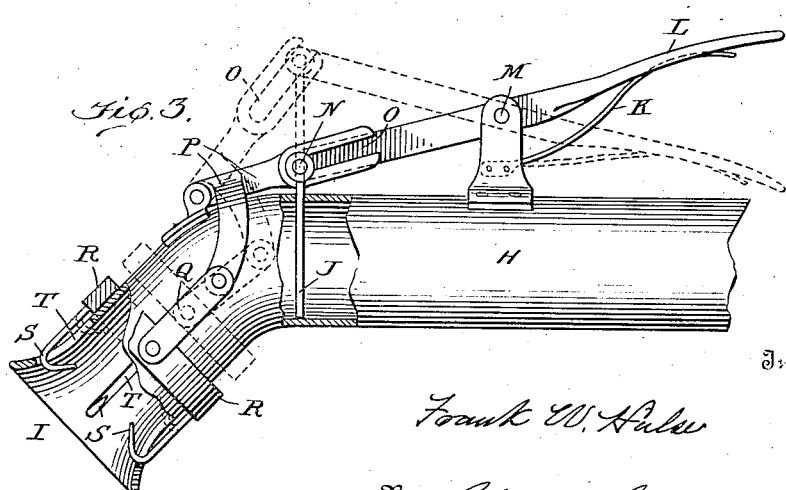

UNITED STATES PATENT OFFICE.

FRANK W. HULSE, OF AUGUSTA, GEORGIA.

COTTON-PICKER.

1,324,549.  Specification of Letters Patent.  Patented Dec. 9, 1919.

Application filed April 21, 1919. Serial No. 291,450.

*To all whom it may concern:*

Be it known that I, FRANK W. HULSE, a citizen of the United States, and resident of Augusta, in the county of Richmond and State of Georgia, have invented certain new and useful Improvements in Cotton-Pickers, of which the following is a specification, reference being had therein to the accompanying drawing.

Cotton picking machines are not, so far as I am aware, in practical use anywhere, although many inventors have produced machines of this kind. It is thought that machines requiring a skilled operator, or that are very expensive, or that deliver cotton with leaves or other extraneous matter, or that injure the growing portions of the plant, cannot be practically successful in ordinary cotton fields.

To avoid the evils suggested is the object of this invention, and this end is sought through employing a common type of picker but materially modifying it.

In the accompanying drawings:

Figure 1 is a plan view showing a picker embodying my invention.

Fig. 2 shows the same devices in elevation.

Fig. 3 is a detail of a hand piece.

In these figures, A represents any suitable vehicle, preferably one having axles of adjustable length having the middle portion above the line of the end portion and variable in height. B represents any suitable motor mounted upon the vehicle and driving a pneumatic blower preferably arranged to create suction in a pipe D for bringing cotton into a receptacle E carried by the vehicle. This pipe has two or more flexible branches F and each of these is forked to form two flexible branches F, each terminating in a hand piece H adapted to have its open mouth I placed over cotton bolls. Normally the passage leading from the end I to the fan is closed so that nothing can be drawn into the mouth, but the part grasped by the hand is provided with devices whereby the hand guiding the member H may cause the momentary opening and closing. As shown for illustration, a valve J normally held closed by a spring K is opened by pressure of the hand upon a handle L and instantly closed when such pressure ceases. Either hand of the operator, then, guides the member H which it holds placing it over the boll to be picked and when sure that no leaves or extraneous matter have entered the mouth, the operator opens the valve and the cotton engaged disappears from the mouth and is delivered in the receptacle E.

The handle L is pivoted at M and has a pin N engaged in a slot O in one arm of a bell crank P whose opposite end is forked and connected by links Q to a sleeve R sliding on the tube H and carrying boll-engaging hooks S which slide in slots T in the tube. These hooks engage the cotton when the mouth is adjusted over the boll. Pressure of the hand on the lever L simultaneously opens the valve and retracts the hooks pulling from the stem the engaged cotton, if it is not already nearly free therefrom, so that it is instantly started toward the receptacle E. When pressure of the hand ceases, the spring K returns the lever and hooks to initial position. It is to be noted that the mouth is not moved from the boll and air is not thus admitted around the cotton, thereby preventing suction from drawing in cotton. The loosened cotton is therefore acted upon by the full force of the suction, and when pulled free from the plant instantly disappears as before.

Obviously, the device is very simple, inexpensive, and operable by any unskilled person, and further nothing can be drawn into any mouth, however numerous the mouths may be, except for the instant when the operator holds the valve open. It follows that with ordinary care in placing the mouth over the boll, no leaves or trash will accompany the cotton carried to the receptacle, and no suction will by accident be applied to other portions of the cotton plant.

As described, the hand holds open when desired a valve normally closed by a spring, and this is obviously easier than holding closed a normally open valve.

What I claim is:

1. The combination with suction devices and a flexible tube leading therefrom and provided with a terminal extension having a mouth adapted to be placed over a cotton boll, of a valve at some distance from the mouth and controlling suction thereat, spurs projecting into said extension, and spring devices operated by the hand grasping said extension for instantly controlling the position of the valve and of said spurs.

2. The combination with suction devices and a flexible tube leading therefrom and having a cut-off valve normally urged to closed position by a spring, of a terminal hand piece, for said tube, provided with a mouth adapted to be pressed over a cotton boll, inwardly inclined spurs or hooks projecting laterally into the mouth passage and arranged to be moved suddenly away from the open side of the mouth by the hand which is grasping the mouthpiece, and spring devices for returning the hooks to initial position when released by the hand.

3. The combination with a suction device and a flexible tube leading therefrom and provided with a terminal portion having a mouth adapted to fit over cotton bolls, a spring-actuated valve normally closing said tube and a device whereby closing force exerted by a hand grasping said portion may overcome the force of the spring and open the valve when desired.

4. The combination with a suction device and a flexible tube leading therefrom and provided with a terminal hand-piece having a mouth adapted to fit over cotton bolls, of a cut-off valve controlling the passing of air in said tube, boll-detaching hooks movably mounted in the mouth, means whereby closer grasping by the hand guiding the mouthpiece retracts said hooks and opens said valve, and a spring resisting such action of the hand and restoring the parts to initial position when the action of the hand ceases.

In testimony whereof I hereunto affix my signature.

FRANK W. HULSE.